United States Patent
Yamada et al.

(10) Patent No.: US 7,609,383 B2
(45) Date of Patent: Oct. 27, 2009

(54) OPTICAL SPECTRUM ANALYZER

(75) Inventors: Kiyokazu Yamada, Kusatsu (JP); Shinji Tanaka, Yokohama (JP); Hideaki Kobayashi, Kusatsu (JP)

(73) Assignee: Murata Manufacturing Co. Ltd., Kyoto (JP)

( * ) Notice: Subject to any disclaimer, the term of this patent is extended or adjusted under 35 U.S.C. 154(b) by 0 days.

(21) Appl. No.: 12/165,721

(22) Filed: Jul. 1, 2008

(65) Prior Publication Data

US 2008/0259332 A1    Oct. 23, 2008

Related U.S. Application Data

(63) Continuation of application No. PCT/JP2007/050461, filed on Jan. 16, 2007.

(30) Foreign Application Priority Data

Jan. 17, 2006    (JP)    ............................. 2006-008312

(51) Int. Cl.
    *G01B 9/02*    (2006.01)
(52) U.S. Cl. ..................................... 356/451
(58) Field of Classification Search .................. 356/451, 356/452, 454, 477, 479, 480
    See application file for complete search history.

(56) References Cited

U.S. PATENT DOCUMENTS 6,552,785 B2    4/2003    Matsubara

FOREIGN PATENT DOCUMENTS

| JP | 02-194337 A | 7/1990 |
|---|---|---|
| JP | 2001-264167 A | 9/2001 |
| JP | 2002-214459 A | 7/2002 |
| JP | 2004-077416 A | 3/2004 |
| JP | 2007-178258 A | 7/2007 |

OTHER PUBLICATIONS

Official communication issued in the International Application No. PCT/JP2007/050461, mailed on Feb. 27, 2007.

*Primary Examiner*—Hwa (Andrew) S. Lee
(74) *Attorney, Agent, or Firm*—Keating & Bennett, LLP

(57) ABSTRACT

An optical spectrum analyzer detects a light output that is dependent on the frequency of light in a wavelength range of light to be measured. The optical spectrum analyzer includes a waveguide acousto-optic tunable filter including a piezoelectric substrate, optical waveguides, and an IDT, a light source for providing, to the waveguide acousto-optic tunable filter, reference light having a particular wavelength outside the wavelength range, a driving circuit for providing, to the waveguide acousto-optic tunable filter, a high frequency signal for exciting an IDT, and an arithmetic device that, on the basis of the wavelength of selected light when reference light is incident, and an exciting frequency, corrects the wavelength of the selected light, which is obtained from the light to be measured.

16 Claims, 7 Drawing Sheets

OPTICAL SPECTRUM ANALYZER

BACKGROUND OF THE INVENTION

1. Field of the Invention

The present invention relates to an optical spectrum analyzer using a waveguide acousto-optic tunable filter.

2. Description of the Related Art

In order to measure a light output in a wavelength range of light to be measured, various optical spectrum analyzers have been disclosed. For example, Japanese Unexamined Patent Application Publication No. 2002-214459 discloses an optical spectrum analyzer including a tunable filter using an arrayed waveguide grating. Here, by using the arrayed waveguide grating, light having a target wavelength is extracted. Japanese Unexamined Patent Application Publication No. 2002-214459 also discloses that, by thermo-regulating the arrayed waveguide grating, a target wavelength can be changed.

Further, Japanese Unexamined Patent Application Publication No. 2001-264167 discloses an optical spectrum analyzer using a tunable fiber grating. By using the tunable fiber grating, light having a target wavelength is extracted. Here, the optical spectrum analyzer is configured so that, by extending or contracting the fiber grating using a piezoelectric element, a target wavelength can be changed.

In an optical analyzer using an arrayed waveguide grating, by using a Peltier element, a heater, or other suitable device to perform thermo-regulation, a wavelength is changed. Accordingly, the spectrum analyzer does not include any mechanical driving parts, but takes a relatively long time for its temperature to change. Thus, this optical spectrum analyzer is unsuitable for high speed measurement.

On the other hand, the optical spectrum analyzer, using the wavelength variable fiber grating, as described in Japanese Unexamined Patent Application Publication No. 2001-264167, is relatively small because it uses a piezoelectric element, and can perform measurements at a relatively high speed. However, it has a problem of a narrow tunable range.

SUMMARY OF THE INVENTION

To overcome the problems described above, preferred embodiments of the present invention provide an optical spectrum analyzer that uses a waveguide acousto-optic tunable filter (AOTF), and thus, can have a relatively small size and can perform high speed measurement, and, in addition, can measure an optical spectrum with improved accuracy.

A preferred embodiment of the present invention provides an optical spectrum analyzer for detecting a light output that is dependent on the frequency of light in a wavelength range of light to be measured. The optical spectrum analyzer includes a waveguide acousto-optic tunable filter including a piezoelectric substrate, an optical waveguide provided on the piezoelectric substrate, and an IDT arranged to convert the mode of light being propagated in the middle of the optical waveguide, a light source for providing, to the waveguide acousto-optic tunable filter, reference light having a particular wavelength outside the wavelength range, a driving circuit arranged to excite the IDT of the waveguide acousto-optic tunable filter by supplying a high frequency signal, a photoreceptor that receives light that is output from the waveguide acousto-optic tunable filter, and an arithmetic device in which, based on the wavelength of selected light that is output when the mode of the reference light is converted by causing the reference light to be incident on the waveguide acousto-optic tunable filter and by applying and exciting high frequency waves having a predetermined frequency to the IDT, a relationship between the frequency of the high frequency waves applied to the IDT and the wavelength of the selected light selected from the light to be measured is corrected.

In a preferred embodiment of the optical spectrum analyzer according to the present invention, the light source preferably includes a light generator that generates light having various wavelengths, and a fiber Bragg grating (FBG) that enables, from the light given from the light generator, output of only light having a particular wavelength. With this configuration, an inexpensive generator that generates light having a relatively wide band that reflects light having various wavelengths can be used as the light generator. Accordingly, the cost of the optical spectrum analyzer can be reduced.

In another preferred embodiment of the optical spectrum analyzer according to the present invention, the light source is a laser source. When using the laser source, light having a particular wavelength can be obtained from the laser source. Thus, the FBG or other suitable grating is not required, such that the size of the light source can be reduced and the structure of the light source can be simplified.

In another preferred embodiment of the optical spectrum analyzer according to the present invention, the light source is configured so that first and second types of light having different wavelengths are provided as the reference light, and a relationship between the frequency of the high frequency waves applied to the IDT and the wavelength of the selected light is corrected by the first and second types of light. Therefore, as described later, a relationship between the wavelength of selected light and the frequency of the high frequency signal for exciting the IDT can be obtained at two points. Thus, despite a gradient of a wavelength change $d\lambda$ of the selected light to a frequency change $df$ of the high frequency signal, that is, despite a change in $d\lambda/df$ based on the temperature, the optical spectrum can be measured with higher accuracy.

In another preferred embodiment of the optical spectrum analyzer according to the present invention, an optical spectrum analyzer for use in combination with an optical sensor for detecting a predetermined physical quantity is provided, wherein the optical sensor includes a light source and an optical detecting unit, and the light source of the optical spectrum analyzer is shared with the light source of the optical sensor. With this configuration, since the light source is shared with the optical sensor, the overall size of an apparatus including the optical sensor and the optical spectrum analyzer can be reduced.

In the optical spectrum analyzer according to preferred embodiments of the present invention, when detecting a light output that is dependent on the frequency of light in a wavelength range of light to be measured, since the optical spectrum analyzer includes the waveguide acousto-optic tunable filter, the light source, the driving circuit, the photoreceptor, and the arithmetic device, by using the reference light, whose wavelength is known beforehand, the frequency of a signal for exciting the IDT can be accurately converted into the wavelength of the selected light.

In other words, in the waveguide acousto-optic tunable filter, the light to be measured is propagated in a single polarization mode on the optical waveguide. Where a high frequency signal having a predetermined frequency is applied from the IDT, the polarization mode of the light being propagated is converted, and, from the acousto-optic tunable filter, light having a particular wavelength can be separated and output. In this case, the wavelength of the selected light that is output corresponds to the frequency of the high frequency signal applied to the IDT at approximately 1:1. Therefore, by changing the frequency of the signal for exciting the IDT in accordance with the wavelength range, the light output that is dependent on the frequency of light in a wavelength range can be detected.

However, although the frequency of the high frequency signal for exciting the IDT corresponds to the wavelength of the selected light at approximately 1:1, a ratio at which the wavelength of the selected light changes, when the frequency of the high frequency signal is changed, varies depending on the temperature. In other words, when df is a change in frequency of the high frequency signal, and dλ is a change in wavelength of the selected light to the frequency of the high frequency signal, dλ/df is dependent upon temperature. Therefore, there is a possibility that the wavelength of the selected light may shift from a wavelength corresponding to the frequency of the high frequency signal applied when the IDT is excited, depending on the operating temperature.

In contrast, according to preferred embodiments of the present invention, reference light having a specific known wavelength is input from the light source. When a high frequency signal having a predetermined frequency is applied, on the basis of the frequency of the high frequency signal and the wavelength of selected light, the wavelength of the selected light, which is selected from the light to be measured, is corrected. Therefore, the optical spectrum can be detected with higher accuracy, even when the temperature changes.

Thus, according to preferred embodiments of the present invention, by using a waveguide acousto-optic tunable filter that does not require mechanical driving parts and whose size is reduced, the optical spectrum can be measured with high speed and outstanding accuracy.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

The present invention will be clarified by describing specific preferred embodiments of the present invention with reference to the drawings.

Figure 1:
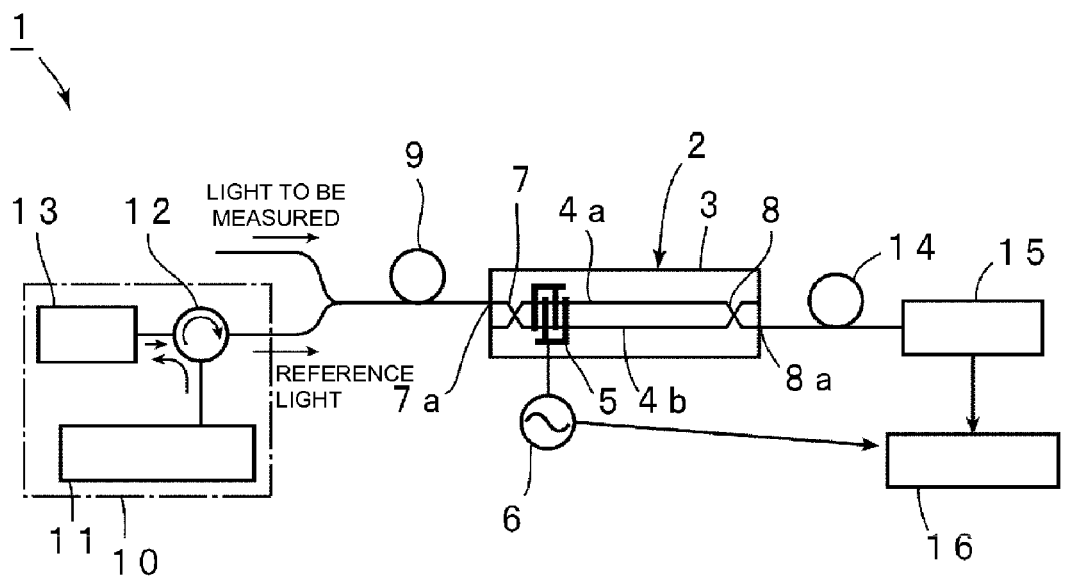
FIG. 1 is a schematic diagram of an optical spectrum analyzer according to a first preferred embodiment of the present invention.

FIG. 1 is a schematic diagram of an optical spectrum analyzer according to a first preferred embodiment of the present invention.

The optical spectrum analyzer 1 includes a waveguide acousto-optic tunable filter 2 to which light to be measured is input and from which selected light is output. The waveguide acousto-optic tunable filter 2 includes a piezoelectric substrate 3. In this preferred embodiment of the present invention, the piezoelectric substrate 3 is preferably made of a $LiNbO_3$ piezoelectric monocrystal substrate. However, the piezoelectric substrate 3 may be made of a different piezoelectric monocrystal or may be made of a piezoelectric ceramic.

On the piezoelectric substrate 3, optical waveguides 4a and 4b are provided. An IDT 5 is provided in a portion of the optical waveguides 4a and 4b. The IDT 5 is electrically connected to a driving circuit 6. The IDT 5 includes a pair of interlocking comb electrodes having a plurality of electrode fingers. When a high frequency signal is applied to the IDT 5, the IDT 5 is excited and a surface acoustic wave is excited. This excitation of the surface acoustic wave converts a polarization mode of light that converts the optical waveguides 4a and 4b into a single polarization mode.

In addition, a cross waveguide polarizing splitter 7 is disposed closer to an input side of the optical waveguides 4a and 4b than the IDT 5, and a cross waveguide polarizing splitter 8 is similarly provided on an output side of the optical waveguides 4a and 4b.

The waveguide acousto-optic tunable filter 2 that includes the optical waveguides 4a and 4b, the IDT 5, and the polarizing splitters 7 and 8 has been known as a non-dependent AOTF.

In the waveguide acousto-optic tunable filter 2, which is a non-polarization-dependent AOTF, light to be measured, and reference light, which is described below, are incident on one incident end 7a of the polarizing splitter 7 provided on an incident side. As described below, selected light is emitted from one emitting end 8a of the second cross waveguide polarizing splitter 8.

The IDT 5 can be made of Al, Cu, or any suitable metal or alloy.

Further, the optical waveguides 4a and 4b, and the cross waveguide polarizing splitters 7 and 8 can be made in accordance with a known technique in which Ti is diffused in a portion of a piezoelectric substrate.

In this preferred embodiment, an incident optical fiber 9 is connected to the one incident end 7a of the waveguide acousto-optic tunable filter 2. The light to be measured or the reference light is incident on the incident optical fiber 9. Here, the reference light is incident from a light source 10 on the incident optical fiber 9. The light source 10 includes a wideband light source 11 having a relatively wide band, that is, the wideband light source 11, which generates light having various wavelengths, an optical circulator 12, and an FBG 13. The FBG 13 is a fiber Bragg grating, and has a function of reflecting and emitting light having a predetermined wavelength. The wavelength of the reference light is outside a wavelength range in which the spectrum of the light to be measured is measured and is within a wavelength range that can be monitored by the AOTF.

Figure 2:
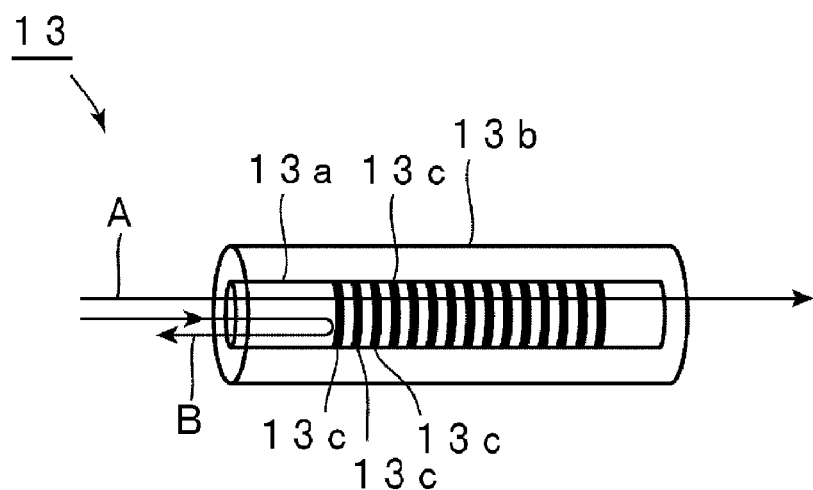
FIG. 2 is a schematic diagram illustrating the structure of an FBG used in the first preferred embodiment of the present invention.

FIG. 2 is a schematic perspective view illustrating the functions of the FBG 13. The FBG 13 is provided as a portion of the optical fiber or is provided so as to be joined to the optical fiber. Similar to the optical fiber, the FBG 13 has a core layer 13a, and a clad layer 13b provided around the core layer 13a. Similar to the optical fiber, the FBG 13 has a refractive index difference between the core layer 13a and the clad layer 13b. In addition, in a portion of the clad layer 13b, a different refractive index layer 13c having a refractive index that is different from that of the core layer 13a is provided at a predetermined pitch. Since the different refractive index layer 13c is provided at the predetermined pitch, as indicated by the arrow A, in the light that is incident, only light having a wavelength matching the pitch of the different refractive index layer 13c is reflected as indicated by the arrow B. In other words, only light having a particular wavelength is reflected as indicated by the arrow B, and light having other wavelengths is transmitted.

Referring back to FIG. 1, in this preferred embodiment, in the light which includes light having various wavelength components and which is incident from the wideband light source 11 on an optical circulator 12, only light having a particular wavelength is reflected by the FBG 13 and is provided as the reference light to the input optical fiber 9.

Accordingly, since only light having a particular wavelength can be extracted using the FBG 13, for example, a wideband light source, such as an ASE light source, can be used as the light source 11.

In addition, an optical fiber 14 is connected to the emitting end 8a of the waveguide acousto-optic tunable filter 2. A photoreceptor 15 is connected to an output side of the optical fiber 14. The photoreceptor 15 is defined by, for example, a suitable photoelectric conversion element such as a photodiode, and outputs an electric signal in accordance with the intensity of input light.

In this preferred embodiment, an arithmetic device 16 is electrically connected to the photoreceptor 15. Also, the arithmetic device 16 is electrically connected to the driving circuit 6.

The arithmetic device 16 calculates a light output that is output in accordance with an electric signal provided from the photoreceptor 15. Also, as described below, on the basis of a relationship between the frequency of a high frequency signal that is applied in order to excite the IDT 5 and a known wavelength of the reference light, the arithmetic device 16 corrects a relationship between the frequency of the high frequency signal and the wavelength of selected light selected from the light to be measured, and provides a highly accurate optical spectrum.

An operation of the optical spectrum analyzer 1 according to this preferred embodiment will now be described. In the optical spectrum analyzer 1, the light to be measured is incident from the input optical fiber 9 on the incident end 7a. In this case, the light to be measured includes light having various wavelength components. Accordingly, with the optical spectrum analyzer 1, an output change dependent on the wavelength of light in a wavelength range, that is, a light output dependent on the frequency of light in a wavelength range, is measured.

More specifically, incident light is split by the polarizing splitter 7 into TE mode light and TM mode light. The TE mode light or TM mode light is guided to one optical waveguide 4a, and the TM mode light or TE mode light is guided to the other optical waveguide 4b. In addition, by applying the high frequency signal from the driving circuit 6 to the IDT 5, the IDT 5 is excited and a surface acoustic wave is propagated. This propagation of the surface acoustic wave deforms a crystal structure of the piezoelectric substrate 3, so that, among polarization modes in which propagation through the optical waveguides 4a and 4b is performed in a single polarization mode, a polarization mode of polarization of a particular wavelength according to the frequency of an IDT driving high frequency signal is converted.

In other words, where a high frequency signal having a frequency fa is applied from the driving circuit 6 to the IDT 5, for example, when TE mode polarization is propagated through the optical waveguide 4a, in TE mode polarization, only a polarization mode of a wavelength having a particular wavelength $\lambda a$ is converted into the TM mode. The light having the mode changed in the above manner is separated from light having other wavelengths by the polarizing splitter 8. The separated light is output as selected light from the emitting end 8a and is transmitted to the photoreceptor 15.

In this case, the frequency of the high frequency signal applied to the IDT 5 and the wavelength of the selected light have a one-to-one relationship.

Thus, a high frequency signal in a frequency range according to a wavelength range is applied from the driving circuit 6 to the IDT 5, while performing sweeping, and measurement is performed, whereby a light output change dependent on a wavelength in a wavelength range can be obtained.

However, although the frequency of the high frequency signal applied to the IDT 5 and the wavelength of the selected light have a one-to-one relationship, a wavelength gradient $d\lambda/df$ of the wavelength of the selected light to the frequency changes as the temperature changes. Here, $d\lambda$ represents a change in wavelength of the selected light, and df represents a change of the high frequency signal. In other words, the relationship of the wavelength of the selected light with the frequency of the high frequency signal applied to the IDT 5 has temperature dependency.

Accordingly, when the ambient temperature changes, there is a possibility that the wavelength of the selected light in the obtained optical spectrum may be shifted away from an accurate wavelength.

Conversely, in this preferred embodiment, the reference light is incident from the light source 10, and, based on the result of the reference light, the wavelength of the selected light obtained from the light to be measured is corrected.

Figure 3A:
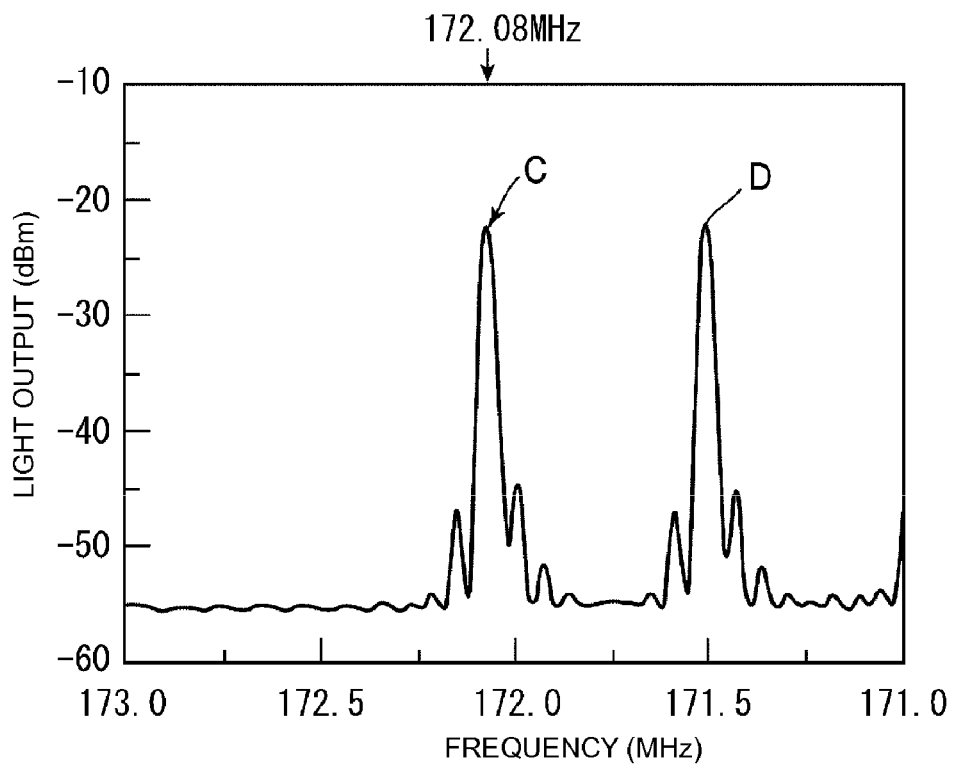
FIG. 3A and FIG. 3B are graphs showing a relationship between a light output measured and a SAW excitement frequency and a relationship between the wavelength of selected light and a light output.

In other words, the reference light has a particular known wavelength determined by the FBG 13. As indicated by the arrows in FIG. 1, the light to be measured and the reference light are simultaneously guided from the input optical fiber 9 to the waveguide acousto-optic tunable filter 2. The guided light to be measured and the reference light are polarized by the polarizing splitter 7 into TE mode light and TM mode light. In this case, for example, a high frequency signal in a predetermined frequency range is applied from the driving circuit 6 to the IDT 5 so that step sweeping is performed. For example, by using reference light having a wavelength of about 1545 nm at a temperature of about 25° C., light to be measured having a wavelength in the vicinity of about 1550 nm is measured. In this case, for example, an IDT exciting high frequency signal is step-swept in about 171 MHz to about 173 MHz. An example of an output waveform obtained from the photoreceptor 15 is shown in FIG. 3A. The horizontal axis of FIG. 3A indicates the frequency of a high frequency signal, and the vertical axis indicates a light output. As shown in FIG. 3A, two peaks appear on the light output. The arrow C denotes a peak responsive to reference light having a wavelength of about 1545 nm, and the arrow D denotes a peak based on the light to be measured.

As is commonly known, the wavelength of selected light in an acousto-optic tunable filter is proportional to the reciprocal of a high frequency signal exciting an IDT. Accordingly, in the case of measuring reference light and light to be measured, as shown above, when the wavelength of the reference light is lower, the peak of the reference light appears on a side having a lower frequency of the high frequency signal. Therefore, FIG. 3A indicates that what is denoted by the arrow C is the peak based on the reference light. However, in the case of using reference light having a particular wavelength, by measuring the frequency of a high frequency signal responsive to a particular wavelength of the reference light in advance at a specific temperature, it is possible to determine which of two peaks in FIG. 3A is based on the reference light.

In addition, although the frequency of the high frequency signal and the wavelength of selected light have a one-to-one relationship, as described above, a change in temperature changes $d\lambda/df$. In this preferred embodiment, despite the change in $d\lambda/df$ caused by the change in temperature, the optical spectrum can be measured with high accuracy. This will be described with reference to FIG. 3B, FIG. 4A, and FIG. 4B.

Figure 3B:
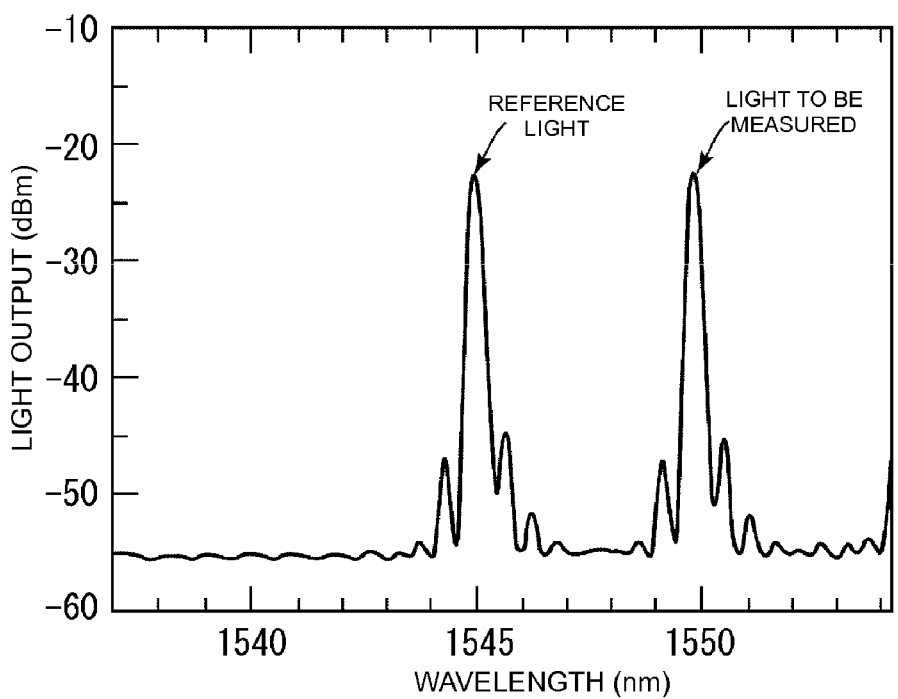
Figure 4A:
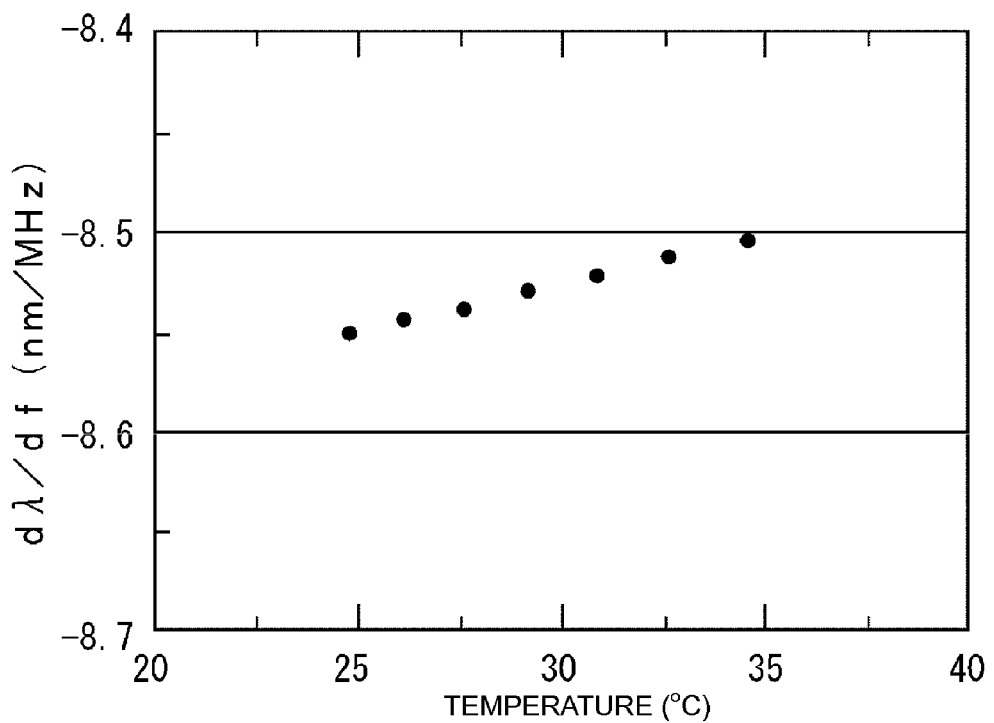
FIG. 4A is a graph showing a change of dλ/df as the temperature changes.

FIG. 4A shows a gradient of wavelength change $d\lambda$ of selected light to frequency change df of the high frequency signal. In other words, FIG. 4A shows a change caused by the changes in the temperature. As shown in FIG. 4A, $d\lambda/df$ is about −8.55 nm/MHz at about 25° C. Also, the frequency, which corresponds to a wavelength of about 1545 nm as reference light, is known. Therefore, in the arithmetic device 16, the wavelength of selected light selected from light to be measured can be determined from the frequency of a high frequency signal based on the relationship of the frequency of the high frequency signal to the wavelength of the reference light. In other words, the wavelength of selected light selected from light to be measured can be corrected on the basis of a relationship between the wavelength of reference light when the reference light is incident, and a high frequency signal. FIG. 3B is a graph obtained by rewriting the optical spectrum shown in FIG. 3A based on the result of correcting a light wavelength by using the above $d\lambda/df$ based on a result when reference light is incident.

Figure 4B:
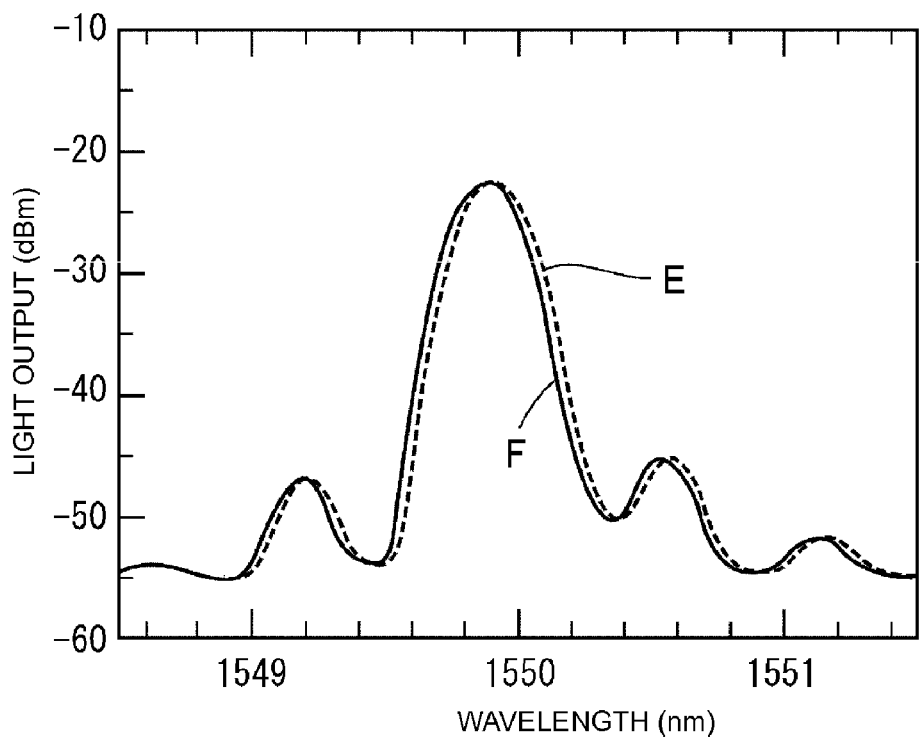
FIG. 4B is a graph showing results of the optical spectrum analyzer that are measured in the first preferred embodiment before correction, and results obtained after correction.

For example, it is assumed that light to be measured in the vicinity of about 1550 nm be measured by using reference light having a wavelength of about 1545 nm at a temperature of about 35° C. In this case, if correction using the above $d\lambda/df$ is not performed, the result indicated by the dotted line E in FIG. 4B is obtained. Conversely, if correction using the above $d\lambda/df$ is performed, the result indicated by the solid line F in FIG. 4B is obtained.

Therefore, even if the ambient temperature changes, the optical spectrum can be measured with higher accuracy.

As described above, the reference light is used to correct the relationship between the exciting frequency and the wavelength of the selected light. Thus, it is necessary for the wavelength of the reference light to exist outside a wavelength range of the light to be measured.

Figure 5:
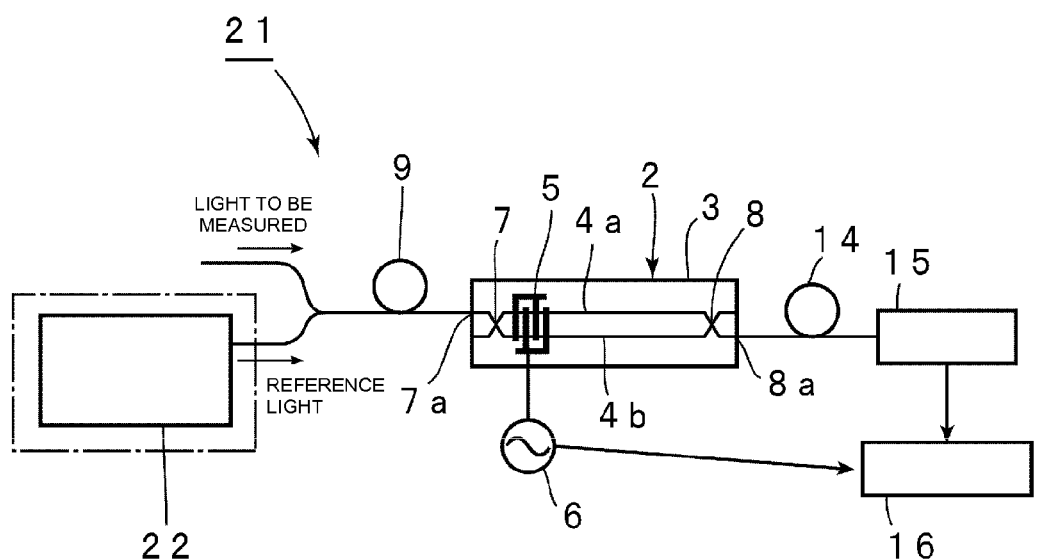
FIG. 5 is a schematic diagram showing an optical spectrum analyzer according to a modification of the first preferred embodiment.

FIG. 5 is a schematic block diagram of an optical analyzer according to a modification of the first preferred embodiment. The optical spectrum analyzer 21 according to this modification is similar to that according to the first preferred embodiment, except that a laser source 22 that emits a beam having a single wavelength is used instead of the light source 10. As described above, instead of a configuration having the wideband light source 11 and the FBG 13, by using the laser source 22 that can emit a beam having a single wavelength, reference light can be transmitted to the acousto-optic tunable filter 2. In other words, in addition to a light source apparatus using the FBG 13, various light sources that emit a beam having a single wavelength, such as the laser source 22, can be used as a light source that transmits reference light.

Figure 6:
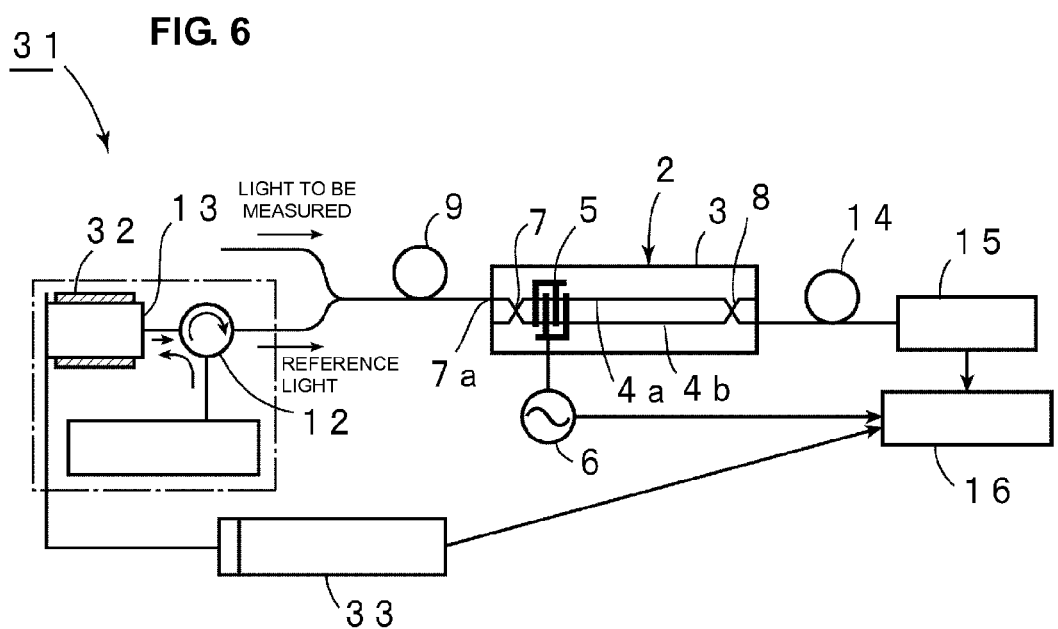
FIG. 6 is a schematic diagram illustrating an optical spectrum analyzer according to a second preferred embodiment of the present invention.

FIG. 6 is a schematic block diagram of an optical spectrum analyzer 31 according to a second preferred embodiment of the present invention.

The optical spectrum analyzer 31 is similar to the optical spectrum analyzer according to the first preferred embodiment, except that it includes an FBG 13, a temperature sensor 32 that detects the temperature of a portion provided with the FBG 13, and a temperature correcting device 33 electrically connected to the temperature sensor 32.

As described above, the FBG 13 reflects and outputs a particular wavelength of light. However, the particular wavelength in the FBG 13 is temperature dependent. In other words, the FBG 13 reflects and emits only light having a particular wavelength. The particular wavelength changes with changes in temperature. In the optical spectrum analyzer 31 according to the second preferred embodiment, the temperature of the FBG 13 is detected by the temperature sensor 32 defining a temperature detecting device. The wavelength of the light reflected by the FBG 13 changes with changes in the temperature. Thus, a change in the wavelength of the reference light, is corrected by the temperature correcting device 33, and the corrected light is transmitted to the arithmetic device 16. Accordingly, in this preferred embodiment, the change in the wavelength of the reference light caused by a change in the temperature is compensated for. Thus, the optical spectrum can be measured with higher accuracy.

Although, in the second preferred embodiment, the temperature sensor 32 defining a temperature detecting device and the temperature correcting device 33 are preferably used, for example, in order to thermoregulate the temperature of the FBG 13, a thermoregulator may be provided. In other words, a thermoregulator may be used so that the temperature of the FBG 13 is maintained at a constant temperature. In this case, reference light having a constant wavelength can be transmitted to the acousto-optic tunable filter 2 without being corrected.

Such a thermoregulator is not particularly limited. A suitable thermoregulator that includes a heater, a temperature sensor, and a controller that switches the heater on and off based on a temperature measured by the temperature sensor can be used.

Figure 7:
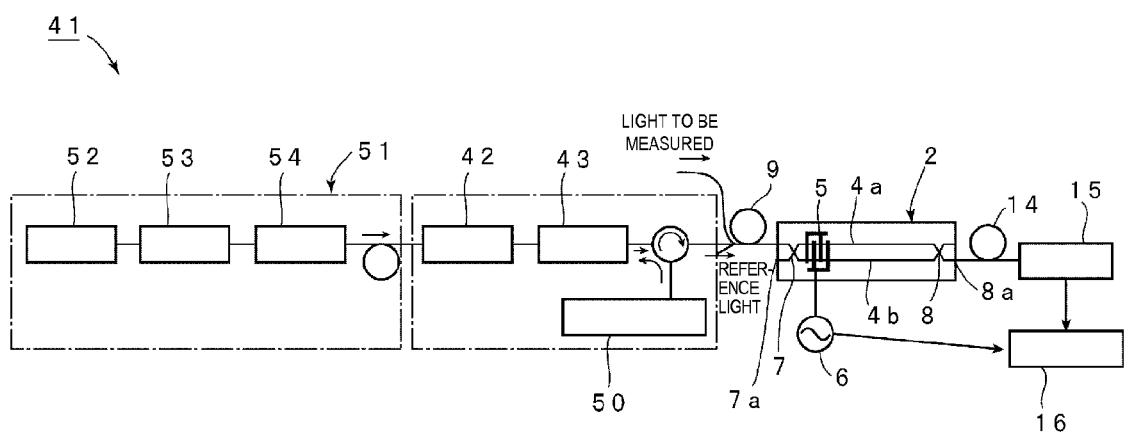
FIG. 7 is a schematic diagram illustrating an optical spectrum analyzer according to a third preferred embodiment of the invention.

FIG. 7 is a schematic block diagram of the configuration of an optical spectrum analyzer according to a third preferred embodiment of the present invention. The optical spectrum analyzer 41 is similar to the optical spectrum analyzer 1 shown in FIG. 1, except that it includes the light source 50 shown in FIG. 7 instead of the light source 10 in the first preferred embodiment, and that it is connected to an optical sensor 51 that is frequently used with optical spectrum analyzers. Accordingly, similar portions are denoted with the same reference numerals, and their detailed description is omitted.

In this preferred embodiment, the light source 50, which has a relatively wide bandwidth, is provided as a light generator that generates light having various wavelengths. The light source 50 is used as a light source for providing reference light in the optical spectrum analyzer 41, and is also used as a light source for the optical sensor 51. In other words, the light source 50 is shared by the optical spectrum analyzer 41 and the optical sensor 51.

The optical sensor 51 is a sensor that detects various physical quantities on the basis of light wavelengths and changes in strength, such as a sensor that detects a displacement based on deformation in the ground. The optical sensor 51 detects a change in light based on a change in target physical quantity. In the optical sensor 51, a plurality of FBGs 52 to 54 are provided. The FBGs 52 to 54 are arranged to respectively reflect light having a wavelength of $\lambda_1$, light having a wavelength of $\lambda_2$, and light having a wavelength of $\lambda_3$, and are connected to one another in series.

Thus, from the light incident from the wideband light source 50 on the FBGs 52 to 54, the light having a wavelength of $\lambda_1$, the light having a wavelength of $\lambda_2$, and the light having a wavelength of $\lambda_3$ can be used in the optical sensor 51.

In addition, in this preferred embodiment, two types of light having two wavelengths are used as reference light that is transmitted to the acousto-optic tunable filter 2. Accordingly, the FBGs 42 and 43 are connected to each other in series. The FBGs 42 and 43 are arranged to reflect only light having a wavelength of $\lambda_a$ and light having a wavelength $\lambda_b$ from the light provided from the light source 50. Thus, from the light incident from the light source 50, two types of light having wavelengths $\lambda_a$ and $\lambda_b$ are provided as a first reference light and a second reference light to the acousto-optic tunable filter 2.

In this preferred embodiment, as described above, two types of reference light having particular wavelengths, a first wavelength of $\lambda_a$ and a second wavelength $\lambda_b$, are transmitted to the acousto-optic tunable filter 2. By performing correction using a plurality of types of reference light in this manner, the optical spectrum can be measured with higher accuracy. This will be described with reference to FIG. 8A and FIG. 8B.

Figure 8A:
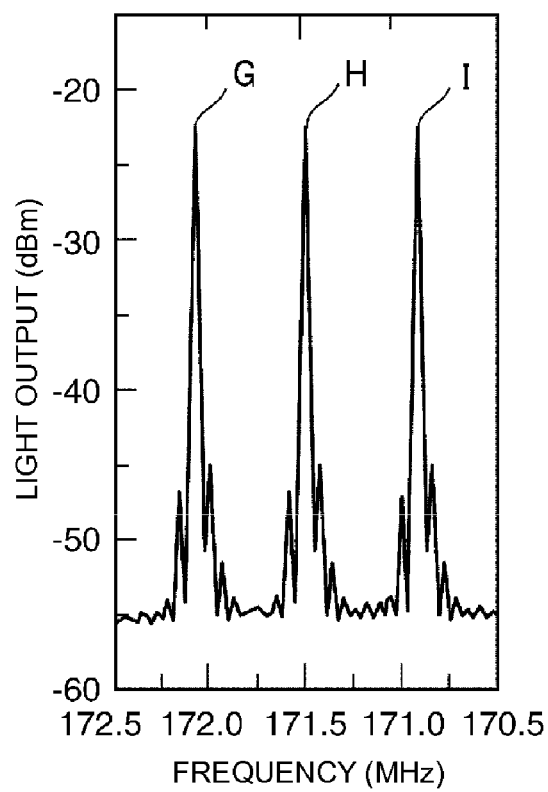
FIG. 8A and FIG. 8B are graphs showing a relationship between a SAW excitement frequency and a light output in the third preferred embodiment and a relationship between the wavelength of selected light and a light output.

A case in which light in the vicinity of about 1550 nm is incident as light to be measured on the optical spectrum analyzer 41 according to this preferred embodiment in order to measure the optical spectrum is described. In this case, the optical spectrum is measured in a similar manner to that in the first preferred embodiment with first reference light wavelength $\lambda_a$=1545 nm and second reference light wavelength $\lambda_b$=1555 nm. As shown in FIG. 8A, when the horizontal axis indicates the frequency of a high frequency signal that excites the IDT 5, three peaks G, H, and I appear. Here, relationships between the first and second light wavelengths $\lambda_a$ and $\lambda_b$, and the exciting frequency are determined beforehand. Also, the wavelength of the selected light and the frequency of a corresponding high frequency signal are inversely proportional to each other. Accordingly, this indicates that peak G represents reference light having a wavelength of about 1545 nm and that peak I represents reference light having a wavelength of about 1555 nm. In addition, peak H is a peak of the light to be measured.

As described above, $d\lambda/df$ has temperature dependency. As in the first preferred embodiment, when the $d\lambda/df$ is corrected by using single reference light, the correspondence between the reference light wavelength and the exciting frequency can be determined at only one point. However, since $d\lambda/df$ itself is unknown, it is unclear to which light wavelength range a sweeping range of the high frequency signal frequency corresponds. Accordingly, in the first preferred embodiment, it is preferable that, after a temperature characteristic of an acousto-optic tunable filter is determined in advance, a change in corresponding $d\lambda/df$ be determined, while monitoring the temperature.

Figure 8B:
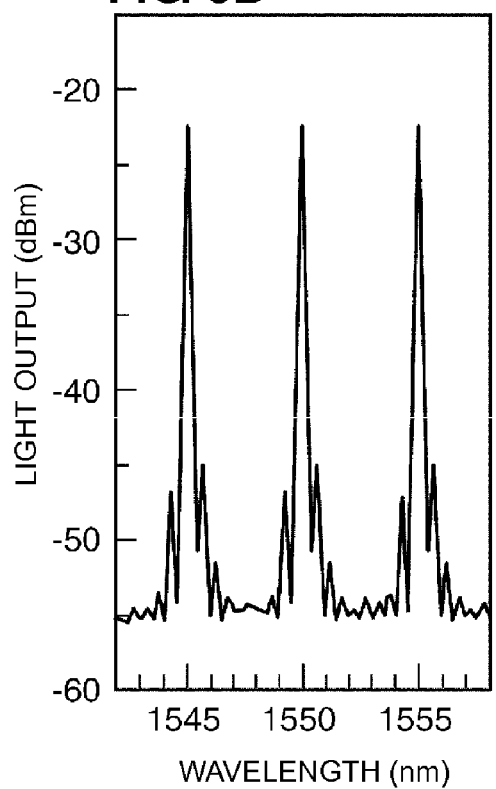

Compared with this, since this preferred embodiment uses the first reference light having a wavelength $\lambda_a$ and the second reference light having a wavelength $\lambda_b$, a relationship between the wavelength of the selected light and the exciting frequency can be determined at two points. Therefore, simultaneously during measurement, $d\lambda/df$ itself can be determined based on a gradient between the two points. In other words, as FIG. 8B shows results obtained by converting the exciting frequency into the wavelength of selected light, a wavelength corresponding to the two types of reference light can be determined. Thus, a wavelength in another wavelength range can be accurately determined. Therefore, an optical spectrum can be detected with high accuracy without providing a complex temperature adjusting device or temperature monitoring device.

In addition, in particular, when using two types of reference light, it is preferable that the wavelength $\lambda_a$ of the reference light and wavelength $\lambda_b$ be dispersed on low-frequency and high-frequency sides of the wavelength range of the light to be measured. This makes it possible to perform more accurate temperature correction in the wavelength range of the light to be measured.

Also, in this preferred embodiment, the optical spectrum analyzer 41 shares the light source with the optical sensor 51. Thus, in the optical spectrum analyzer used with the optical sensor device, a reduced number of components, a reduced cost, and a reduced size are obtained. The light source of the optical spectrum analyzer in the optical sensor 51 can be shared with the optical sensor 51, and can also be used with an apparatus light source.

Figure 9:
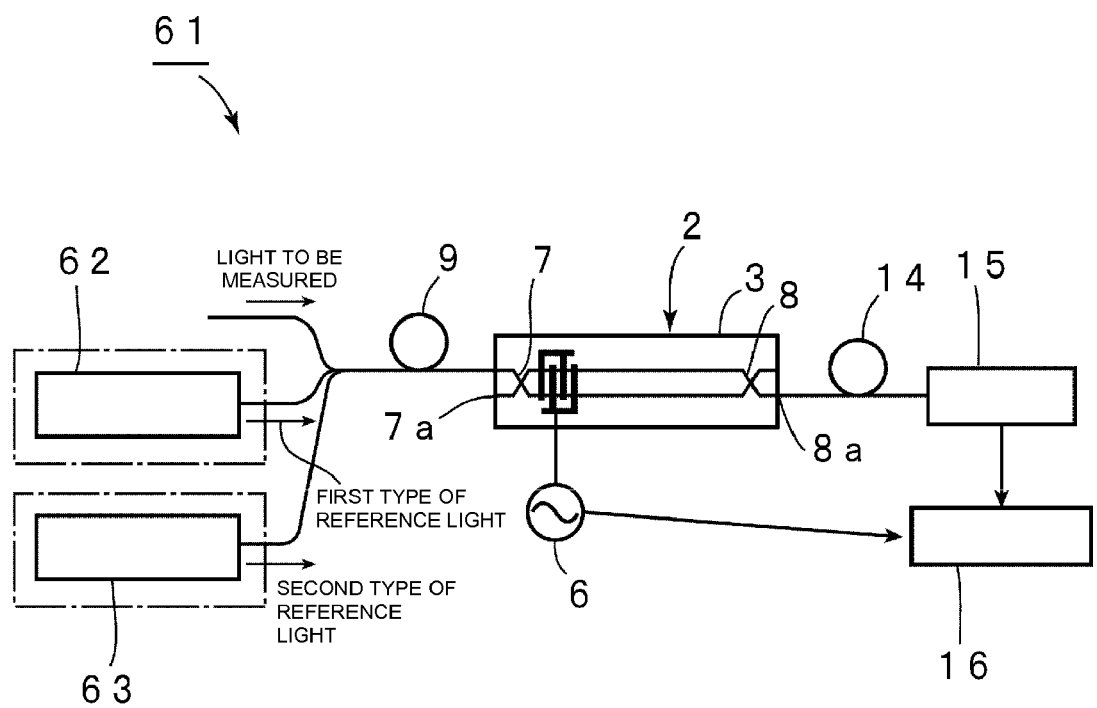
FIG. 9 is a schematic diagram illustrating an optical spectrum analyzer according to a modification of the third preferred embodiment of the present invention.

FIG. 9 is a schematic block diagram showing a modification of the spectrum analyzer according to the third preferred embodiment. In the third preferred embodiment, the light source 50 is used with the optical sensor 51. In this modification, two types of reference light are provided to the waveguide acousto-optic tunable filter 2 by using two types of laser sources 62 and 63 having different oscillating frequencies. When a plurality of types of reference light are provided, laser sources according to the types of reference light may be used as light sources.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An optical spectrum analyzer for detecting a light output that is dependent on the frequency of light in a wavelength range of light to be measured, comprising:

a waveguide acousto-optic tunable filter including a piezoelectric substrate, an optical waveguide provided on the piezoelectric substrate, and an IDT arranged to convert a mode of light being propagated in an approximate middle portion of the optical waveguide;

a light source arranged to provide reference light having a specific wavelength outside of the wavelength range to the waveguide acousto-optic tunable filter;

a driving circuit arranged to excite the IDT of the waveguide acousto-optic tunable filter by supplying a high frequency signal to the IDT;

a photoreceptor that receives light that is output from the waveguide acousto-optic tunable filter; and an arithmetic device arranged to make a correction, based on the wavelength of selected light that is output when a mode of the reference light is converted by causing the reference light to be incident on the waveguide acousto-optic tunable filter and by applying high frequency waves having a predetermined frequency to the IDT and exciting the IDT, to a relationship between the frequency of the high frequency waves applied to the IDT and the wavelength of the selected light selected from the light to be measured.

2. The optical spectrum analyzer according to claim 1, wherein the light source includes a light generator arranged to generate light having various wavelengths, and a fiber Bragg grating arranged to enable output of only light having a specific wavelength from the light generated from the light generator.

3. The optical spectrum analyzer according to claim 1, wherein the light source is a laser source.

4. The optical spectrum analyzer according to claim 1, wherein the light source is arranged such that first and second types of light having different wavelengths are provided as the reference light, and the relationship between the frequency of the high frequency waves applied to the IDT and the wavelength of the selected light is corrected by the first and second types of light.

5. An apparatus comprising:
the optical spectrum analyzer according to claim 1; and
an optical sensor arranged to detect a predetermined physical quantity and including a light source and an optical detecting unit; wherein
the light source of the optical spectrum analyzer is shared with the light source of the optical sensor.

6. The apparatus according to claim 5, wherein the light source includes a light generator arranged to generate light having various wavelengths, and a fiber Bragg grating arranged to enable output of only light having a specific wavelength from the light generated from the light generator.

7. The apparatus according to claim 5, wherein the light source is a laser source.

8. The apparatus according to claim 5, wherein the light source is arranged such that first and second types of light having different wavelengths are provided as the reference light, and the relationship between the frequency of the high frequency waves applied to the IDT and the wavelength of the selected light is corrected by the first and second types of light.

9. An optical spectrum analyzer for detecting a light output that is dependent on the frequency of light in a wavelength range of light to be measured, comprising:
a waveguide non-polarization-dependent acousto-optic tunable filter including a piezoelectric substrate, an optical waveguide provided on the piezoelectric substrate, and an IDT arranged to convert a mode of light being propagated in an approximate middle portion of the optical waveguide;
a light source arranged to provide reference light having a specific wavelength outside of the wavelength range to the waveguide non-polarization-dependent acousto-optic tunable filter;
a driving circuit arranged to excite the IDT of the waveguide non-polarization-dependent acousto-optic tunable filter by supplying a high frequency signal to the IDT;
a photoreceptor arranged to receive light that is output from the waveguide non-polarization-dependent acousto-optic tunable filter; and
an arithmetic device arranged to make a correction, based on the wavelength of selected light that is output when a mode of the reference light is converted by causing the reference light to be incident on the waveguide non-polarization-dependent acousto-optic tunable filter and by applying high frequency waves having a predetermined frequency to the IDT and exciting the IDT, to a relationship between the frequency of the high frequency waves applied to the IDT and the wavelength of the selected light selected from the light to be measured.

10. The optical spectrum analyzer according to claim 9, wherein the light source includes a light generator arranged to generate light having various wavelengths, and a fiber Bragg grating arranged to enable output of only light having a specific wavelength from the light generated from the light generator.

11. The optical spectrum analyzer according to claim 9, wherein the light source is a laser source.

12. The optical spectrum analyzer according to claim 9, wherein the light source is arranged such that first and second types of light having different wavelengths are provided as the reference light, and the relationship between the frequency of the high frequency waves applied to the IDT and the wavelength of the selected light is corrected by the first and second types of light.

13. An apparatus comprising:
the optical spectrum analyzer according to claim 9; and
an optical sensor arranged to detect a predetermined physical quantity and including a light source and an optical detecting unit; wherein
the light source of the optical spectrum analyzer is shared with the light source of the optical sensor.

14. The apparatus according to claim 13, wherein the light source includes a light generator arranged to generate light having various wavelengths, and a fiber Bragg grating arranged to enable output of only light having a specific wavelength from the light generated from the light generator.

15. The apparatus according to claim 13, wherein the light source is a laser source.

16. The apparatus according to claim 13, wherein the light source is arranged such that first and second types of light having different wavelengths are provided as the reference light, and the relationship between the frequency of the high frequency waves applied to the IDT and the wavelength of the selected light is corrected by the first and second types of light.

* * * * *